and that the United States Patent [19]

Toth et al.

[11] 4,215,605
[45] Aug. 5, 1980

[54] FLOATING WORK DRIVER CHUCK

[75] Inventors: Paul Toth, Allen Park; Kenneth O. Cross, Northville, both of Mich.

[73] Assignee: N. A. Woodworth Company, Detroit, Mich.

[21] Appl. No.: 957,470

[22] Filed: Nov. 3, 1978

[51] Int. Cl.² .................... B23B 31/30; B23B 33/00
[52] U.S. Cl. ............................... 82/40 R; 279/4; 279/16; 279/33; 279/106
[58] Field of Search ............... 279/16, 33, 106, 4; 82/40 R, 40 A

[56] References Cited
U.S. PATENT DOCUMENTS

| 1,412,170 | 4/1922 | Dixon | 279/4 |
| 2,018,088 | 10/1935 | Poock et al. | 279/106 X |
| 2,733,072 | 1/1956 | Hohwart et al. | 279/4 |
| 2,885,212 | 5/1959 | Garrison et al. | 279/106 |
| 3,149,853 | 9/1964 | Garrison | 279/106 |
| 3,344,695 | 10/1967 | Hohwart | 82/40 R |
| 3,420,538 | 1/1969 | Benjamin et al. | 279/4 |

Primary Examiner—Z. R. Bilinsky
Attorney, Agent, or Firm—Harness, Dickey & Pierce

[57] ABSTRACT

A work driver chuck having face and actuator plates interconnected by the pivot shafts of work holding cam jaws carried by and journaled for rotative movement in the face plate. Although normally centered on the rotational axis of the chuck, the assembly of plates and jaws is released for limited universal free floating movement during the actual work clamping operation to compensate for eccentricity of or surface irregularities in the workpiece. The actuator plate is slidable relative to the face plate and is operative as it moves to turn the jaws angularly into or out of engagement with the work.

17 Claims, 6 Drawing Figures

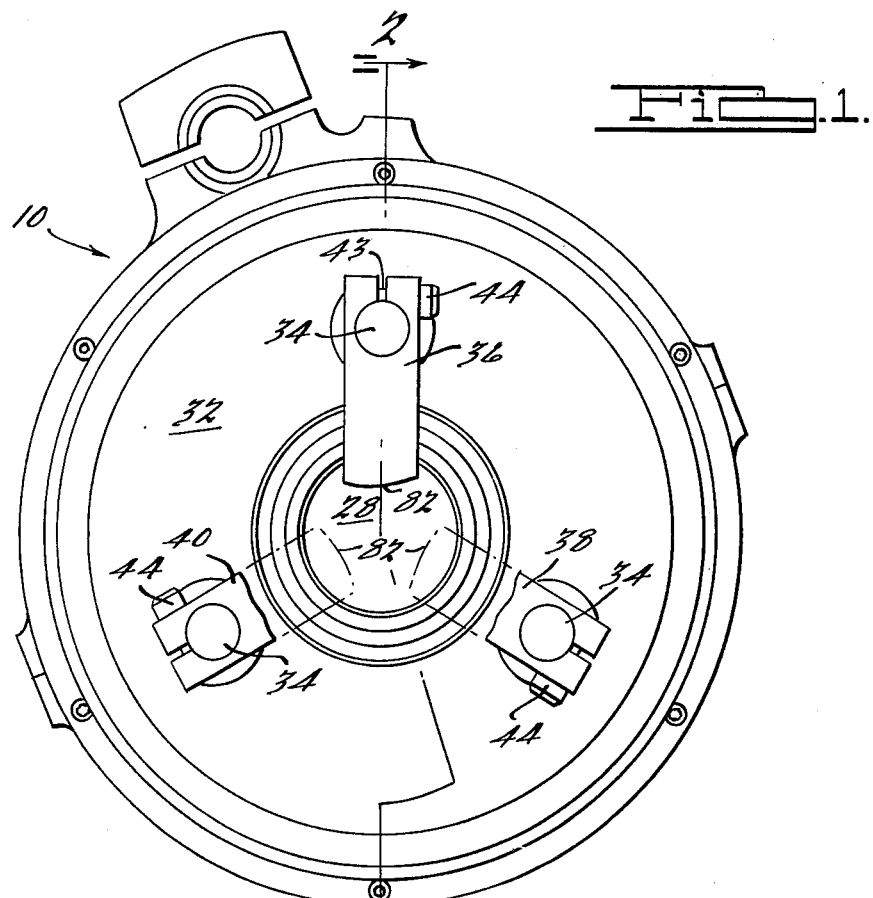
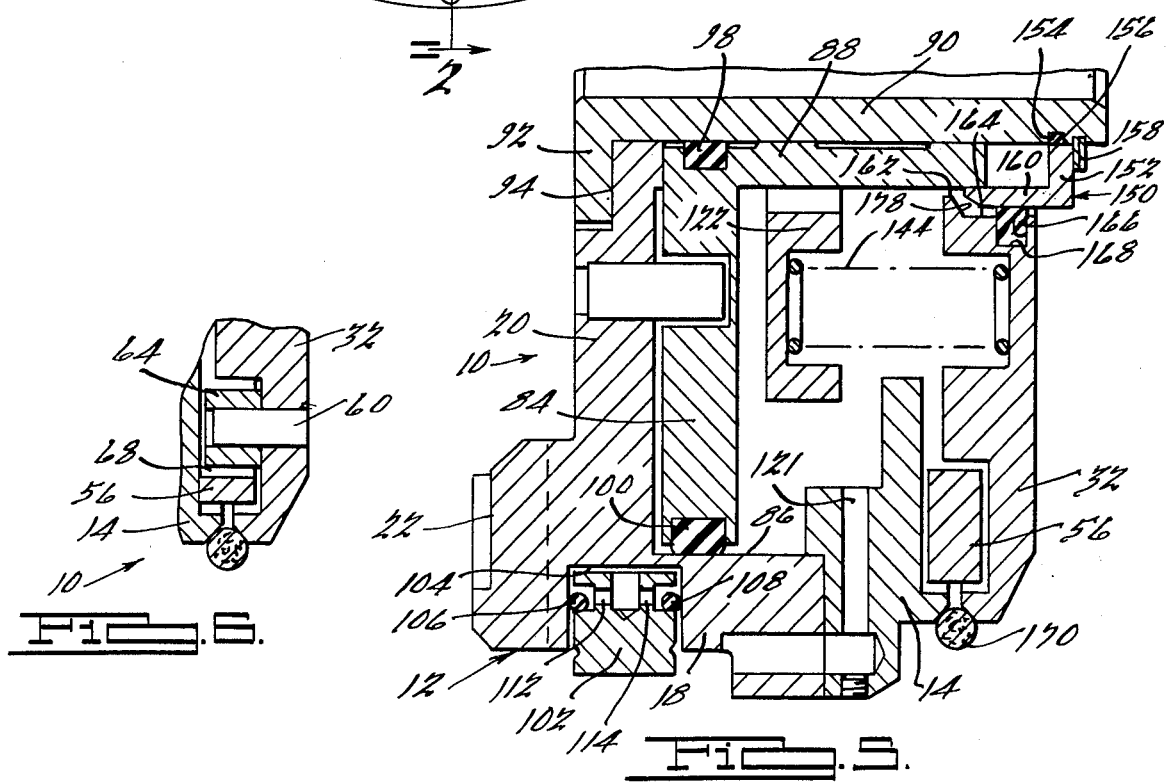

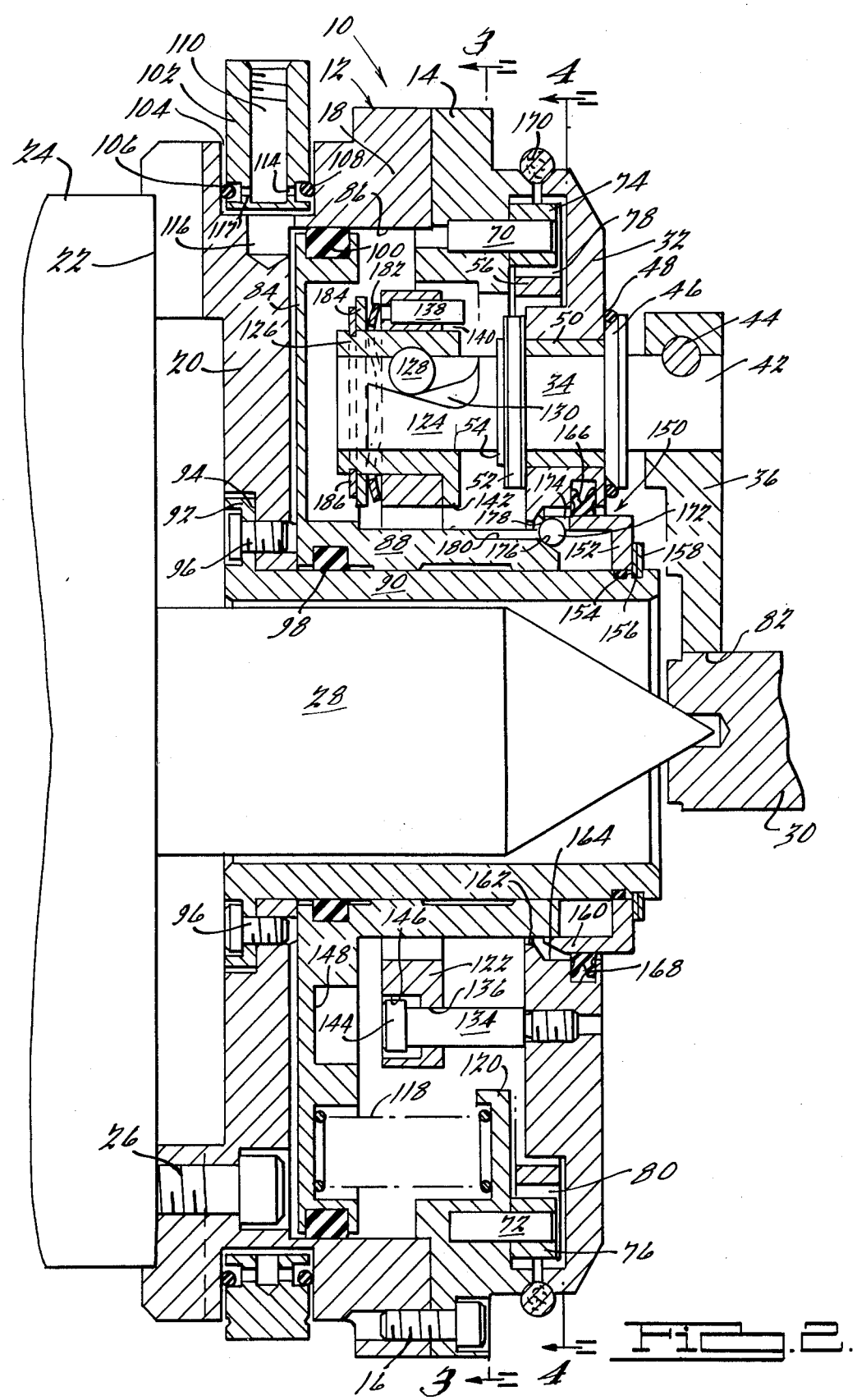

FLOATING WORK DRIVER CHUCK

BACKGROUND OF THE INVENTION

Many kinds of machine tools such as a grinder, for example, position the workpiece on fixed centers or V-blocks and rotate the work through a chuck on the driver spindle. In these machines, the chuck must grip the work with considerable force to assure adequate driving power. This sometimes causes problems especially if the work is fragile or easily distorted and more particularly if the chuck is designed and adapted to compensate for irregularities in or eccentricity of the work surface being chucked. The compensating mechanism used in many chucks adds so much weight that centrifugal force in use tends to bend and distort the workpiece and in any event, if the chuck is not a compensating one, the high gripping force required sometimes flexes and bends the workpiece on the fixed centers or V-block supports.

SUMMARY OF THE INVENTION

The work holding chuck of this invention was developed to overcome the deficiencies of the chucks referred to specifically above. The jaw mounting portion of the present chuck is readily shiftable during clamping to compensate for eccentricity of the work and the jaws clamp the work with relatively great force but the jaw mounting portion is sufficiently light in weight so that centrifugal and other forces generated in use do not bend even relatively fragile workpieces.

DESCRIPTION OF THE DRAWINGS

FIG. 1 is a front or face elevational view of a work driver chuck embodying the present invention;

FIG. 2 is an enlarged, longitudinal sectional view taken on the line 2—2 of FIG. 1;

FIG. 3 is a transverse sectional view taken on the line 3—3 of FIG. 2;

FIG. 6 is a fragmentary, longitudinal sectional view taken on the line 6—6 of FIG. 4.

DESCRIPTION OF THE PREFERRED EMBODIMENT

Figure 4:
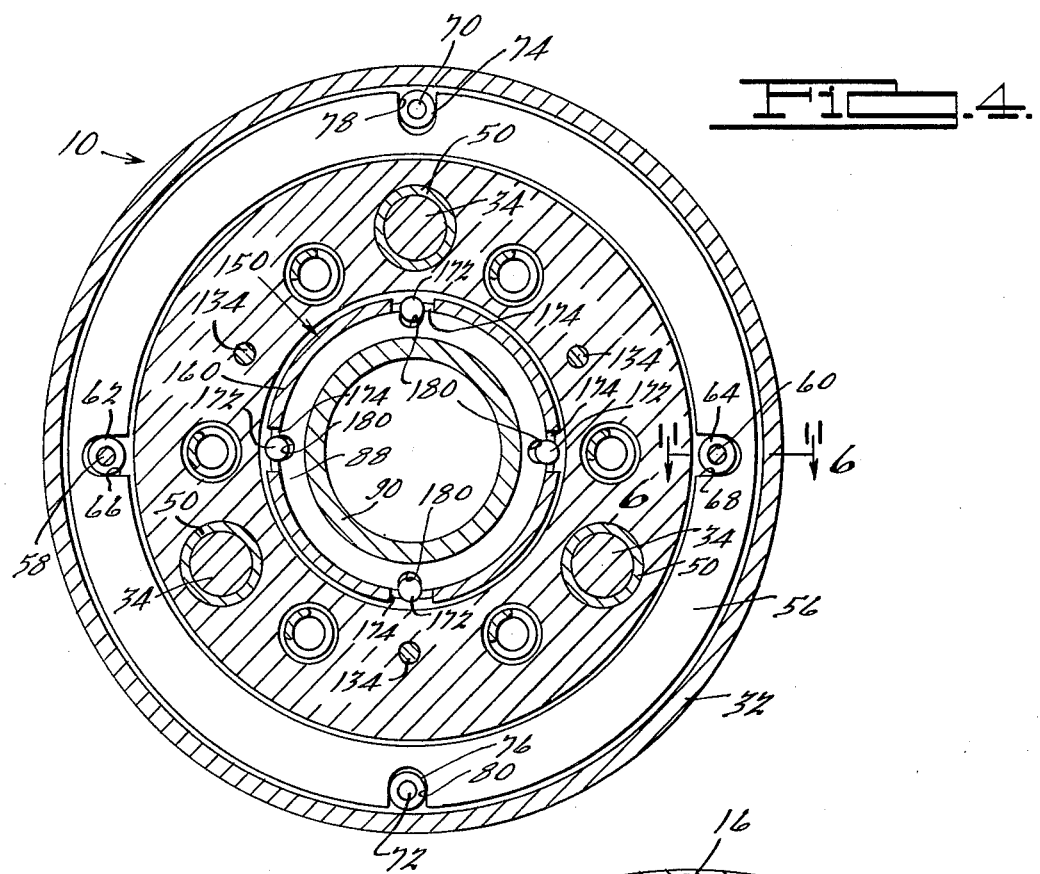
FIG. 4 is a transverse sectional view taken on the line 4—4 of FIG. 2.

In the drawings, wherein for the purpose of illustration is shown a preferred embodiment of the invention, the numeral 10 designates a chuck body comprising a rear adapter plate 12 and a front ring shaped member 14 interconnected by an annular series of screws 16. The two body members 12 and 14 have the same external diameter and the outer cylindrical surfaces thereof extend flush with each other. The front part 18 of the rear body portion 12 is annular or ring shape in form and it has substantially the same internal diameter as the body member 14. At the rear, the body member 12 is formed with a radially inwardly extending bottom wall 20 and the latter has a rearwardly facing, relatively shallow recess 22 that receives and snugly fits the end of a rotatably driven spindle 24 of the type with which the head stock of machines is conventionally provided. An annular series of screws 26 extending rearwardly through the bottom wall 20 and into the spindle 24 fastens the chuck body 10 securely to the spindle. Provided centrally on the spindle 24 is a work holding center 28 which extends through a central opening in the bottom wall 20 and cooperates with a center on the tail stock of the machine (not shown) in the conventional manner to support a workpiece, a fragmentary portion of which is shown at 30. In this connection, it will be readily appreciated that the two centers hold the workpiece 30 on the rotational axis of the machine spindle 24 while a grinding or other machining operation is performed on the workpiece. The machine spindle 24 is rotatably driven in any suitable or conventional manner and it rotatably drives the chuck body 10 through the fastening screws 26.

A face plate 32 at the front of the chuck body 10 carries a plurality of pivot shafts 34 on which cam jaws 36, 38 and 40 are mounted. Rotative or turning movement of the pivot shafts 34 move the jaws 36, 38 and 40 into and out of clamping engagement with the workpiece 30, and when engaged the jaws rotatably drive the workpiece in unison with the chuck. FIG. 2 shows a pivot shaft 34 for the jaw 36 only, but it will be readily appreciated that all three of the jaws 36, 38 and 40 are identically mounted and that all of the pivot shafts 34 are identically formed and that they all operate in precisely the same way. To this end, a detailed illustration and description of the pivot shaft 34 for the cam jaw 36 only will suffice. As shown in the drawing, the jaw 36 is mounted on an outer journal portion 42 of the pivot shaft 34. The attached portion of the jaw 36 is split as at 43 and is held securely on the journal 42 by a fastening screw 44. A radial flange 46 at the base of the journal 42 seats on the face plate 32 and is sealed thereto by an O-ring 48. A bushing 50 supports the pivot shaft 34 for rotation in and relative to the face plate 32. A washer 52 behind the face plate 32 and retained by a snap ring 54 holds the shaft 34 against axial movement relative to the face plate and positions the cam jaw 36 for proper engagement with the workpiece 30.

In practice, it is necessary that the three jaws 36, 38 and 40 engage the workpiece 30 with equal force, but it sometimes happens that the outer surface of the workpiece gripped by the jaws is not concentric to the center of the work. This is true particularly if the workpiece is a rough forging or if the workpiece is bent slightly or otherwise distorted. In any event, in situations of this kind, since the work is held securely on the machine centers, it is necessary that the face plate 32 shift radially and perhaps angularly as well relative to the chuck body 10 in order to equalize the gripping pressures at the jaw faces. To this end, the face plate 32 is mounted for universal radial and angular adjustment on the chuck body 10 preferably through the medium of a driving ring 56 which is fastened to the front body member 14 and to the face plate 32 in the manner shown and described in U.S. Pat. No. 3,344,689 which is hereby incorporated by reference in this description. As shown in FIG. 4, diametrically opposed pins 58 and 60 carried by and extending rearwardly from the face plate 32 carry bearings 62 and 64 respectively that fit snugly in slots 66 and 68 in and opening through the inner edge of the driving ring 56. Other drive pins 70 and 72 carried by and extending forwardly from the front body member 14 at diametrically opposite sides thereof and in right angular relation to the pins 58 and 60 carry bearings 74 and 76 that fit snugly but slidably in slots 78 and 80 that open through the outer edge of the driving ring 56. Rotation of the chuck body 10 is transmitted through the pins 70 and 72 to the ring 56 and thence to the face plate 32 through the pins 58 and 60. If one of the jaws 36, 38 and 40 engages the work 30 first during clamping due to the work being bent or as a result of the surface being clamped being eccentric to the rotational axis of the chuck, the face plate 32 shifts universally relative to the body 10 until clamping pressure at all of the jaw faces is equalized, and this action occurs without interfering in any way with the rotatable driving connection between the chuck body and the face plate.

As shown in FIG. 1, the jaws 36, 38 and 40 extend radially inwardly from their respective pivot shafts 34 and the inner cam faces 82 thereof are adapted to grip the workpiece 30 as the jaws rotate about their pivots. Turning movement of the jaws 36, 38 and 40 clockwise as viewed in FIG. 1 releases them from the work 30 and, contrariwise, turning movement of the jaws in a counterclockwise direction brings the clamping faces 82 thereof into engagement with the work. In practice, the clamping faces 82 are carbide impregnated to enhance the gripping action of the jaws on the work since the chuck frequently is required to grip hardened steel workpieces. The carbide particles are fused to the clamping faces of the jaws and carbide grit of varying fineness or coarseness is used depending on the gripping action required.

The work holding jaws 36, 38 and 40 are turned simultaneously into or out of engagement with the workpiece 30 by a power piston 84 mounted for reciprocation in a cylinder 86 defined by the inner peripheral surface of the annular adapter portion 18 and the inner radial surface of the rear wall portion 20. The piston 84 is formed with a forwardly extending, central tubular hub 88 that surrounds and is slidable on a sleeve 90 carried by and fixed to the wall 20. The sleeve 90 is provided at the rearward end thereof with a radially outwardly extending flange 92 that is received by a recess 94 in the rear face of the wall 20, and an annular series of screws 96 extending forwardly through the flange 92 and into the adapter member 12 fasten the two securely together. An inner piston ring 98 seals the hub 88 to the sleeve 90, and an outer piston ring 100 seals the periphery of the piston 84 to the wall of the cylinder 86.

Air under pressure is admitted into the cylinder 86 behind the piston 84 through a slip ring 102 that conveniently may be of the type disclosed in U.S. Pat. No. 3,130,645 which is hereby incorporated by reference in the present disclosure. As shown in FIG. 2, the slip ring 102 fits loosely in a peripheral recess 104 provided in the adapter member 12 and the sides of the slip ring are sealed to the sides of the recess by O-rings 106 and 108. Air introduced under pressure from any suitable source through an inlet 110 in the ring 102 passes through lateral ports 112 and 114 in the slip ring 102 and thence through an outlet 116 into the cylinder 86 behind the piston 84. An annular series of compression springs 118 confined between the front face of the piston 84 and radially inwardly extending abutments 120 on the front body member 14 retract the piston in the cylinder 86. Air pressure in the cylinder 86 behind the piston 84 causes the latter to advance in the cylinder against the resilient action of the springs 118, and as the piston advances air trapped in the cylinder ahead of the piston is vented through a passage 121 in the circumferential wall of the body 10. The springs 118 return the piston 84 to its retracted position when air at the slip ring 102 is shut off and the cylinder 86 behind the piston is vented to atmosphere.

Forward motion of the piston 84 turns the work clamping jaws 36, 38 and 40 through the medium of a pressure or actuator plate 122 of generally triangular configuration (FIG. 3) interposed between the piston and the face plate 32. The rear shank portions 124 of the jaw pivots 34 are slidably received in bushings 126 mounted in the apices of the actuator plate 122, and cross pins 128 carried by the bushings extend transversely of and seat against helical cam surfaces 130 formed in the shank portions 124. The actuator plate 122 moves axially in the space between the face plate 32 and the piston 84. Forward axial movement of the actuator plate 122 causes the cross pins 128 to move along the helical cam surfaces 130 to rotatably actuate the pivot shafts 34 in a direction to turn the jaws 36, 38 and 40 away from or out of clamping engagement with the work 30. Conversely, rearward axial movement of the actuator plate 122 causes the cross pins 128 to move along the cam surfaces 130 in a direction to rotatably actuate the pivot shafts 34 in the opposite direction to engage the jaws 36, 38 and 40 with the work 30.

The actuator plate 122 is moved forwardly under power by the piston 84. Shortly after the piston 84 begins to advance in the cylinder 86, it engages the actuator plate 122 so that the two move forwardly in unison during the latter portion of the piston stroke. The piston 84 continues to advance under power until the jaws 36, 38 and 40 are fully open and pressure in the cylinder 86 behind the piston thereafter holds the jaws in the open position until pressure in the air supply line is shut off and the cylinder 86 behind the piston is vented to atmosphere. Headed guide pins 134 extending rearwardly from the face plate 32 slide in openings 136 provided in the actuator plate 122 to hold the latter against angular or rotative movement during the operation described above, and dowels 138 carried by the actuator plate 122 extend through slots 140 in radial flanges 142 formed on the bushings 126 to keep the latter from turning under counter-pressure imposed by the helical cam surfaces 130 against the cross pins 128 during axial movement of the actuator plate. Compression springs 144 interposed between the face plate 32 and the actuator plate 122 retract the latter to engage the jaws 36, 38 and 40 with the work 30 when the piston 84 retracts under action of the compression springs 118. The head portions 144 of the guide pins 134 seat in recesses 146 provided in the rear face of the actuator plate 122 to limit retractive movement of the latter. When the actuator plate 122 is picked up and advanced by the piston 84, the headed rear portions of the guide pins 134 are accepted in recesses 148 provided in the piston.

From the foregoing, it will be readily apparent that the work holding jaws 36, 38 and 40 engage the peripheral surface of the workpiece 30 at three substantially equispaced places on the surface. In practice, however, it frequently happens that the peripheral surface engaged by the jaws 36, 38 and 40 is eccentric with respect to the rotational axes of the work holding centers and consequently to the rotational axis of the chuck itself. It sometimes happens also that the workpiece 30 is bent or distorted so that the surface engaged by the jaws is tilted with respect to the rotational axis. It is desirable under these conditions that the chuck grip the work securely without bending or stressing it in any way. In other words, it is important that the chuck not try to straighten a bent workpiece when it is clamped by the chuck jaws. Notwithstanding these considerations, however, it is necessary also that the chuck rotatably drive the workpiece in use and that the jaws grip the work with sufficient force to hold the workpiece while grinding, cutting or other machining operations are performed thereon. According to the present invention, the work is gripped with adequate force without being distorted, in part at least, by mounting the face plate 32 which carries the jaws 36, 38 and 40 so that it is free to move for at least limited distances radially and angularly with respect to the chuck body 10. If the face plate is not free to move in this manner, the jaws will try to straighten the workpiece as that is the only way that pressure at the jaw faces can be equalized, and if this happens the workpiece will tend to spring back to its original shape when it is released by the chuck with the consequence that a surface that has been ground concentric to the rotational axis of the chuck will no longer be concentric to the axis of the workpiece in the relaxed, unstressed condition of the latter.

Figure 5:
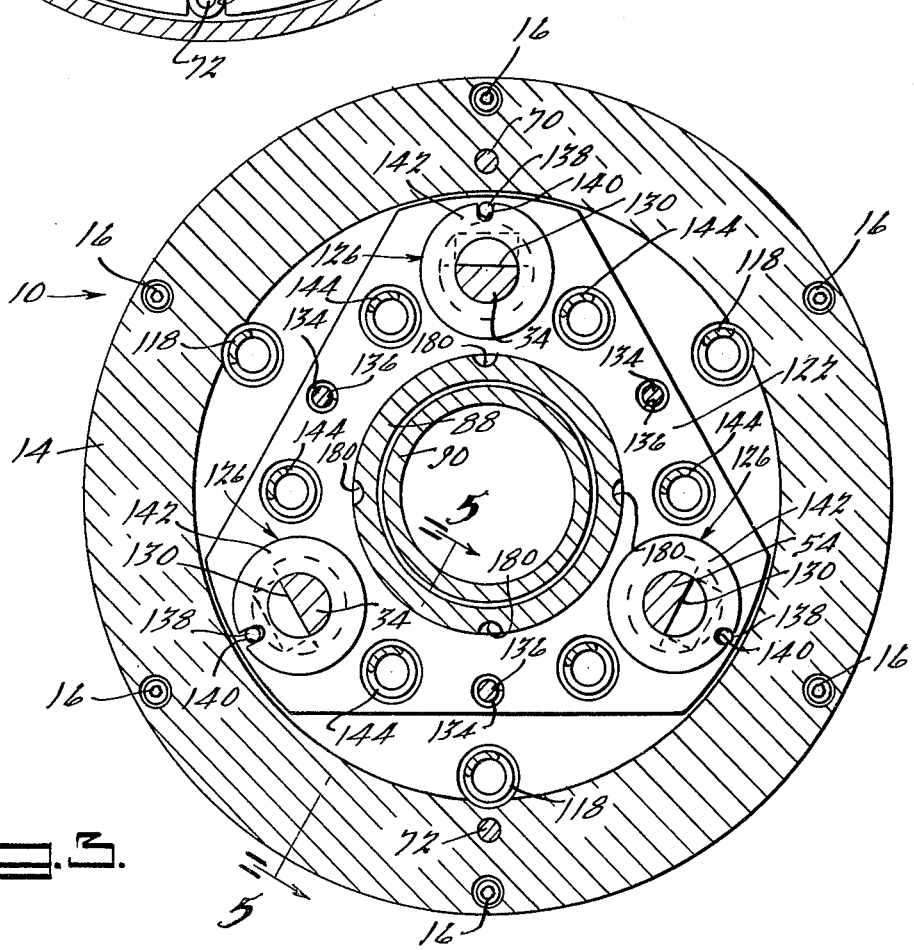
FIG. 5 is an enlarged, fragmentary, longitudinal sectional view taken on the line 5—5 of FIG. 3 but showing the chuck body detached from the machine spindle.

According to the present invention and in view of the foregoing, the face plate 32 is held assembled on the body 10 by a retaining ring 150, as perhaps best shown in FIG. 2. The retaining ring 150 has a radially inwardly extending forward flange portion 152 that surrounds and snugly fits the sleeve 90. The inner peripheral edge of the retainer flange 152 is sealed by an O-ring 154 disposed in a peripheral groove 156 in the sleeve 90 adjacent to the forward end of the retainer. A spiral snap ring 158 carried by the sleeve 90 ahead of the retainer flange 152 constrains the retainer 150 against outward axial movement on the sleeve. The retaining ring 150 also has an outer rearwardly extending flange 160 that fits snugly but slidably around the forward terminal portion of the piston hub 88 (FIG. 5). A central opening 162 in the face plate 32 fits loosely around the piston hub 88, and the rearwardly extending peripheral flange 160 of the retaining ring 150 is loosely received in an enlarged outer portion 164 of the opening 162. Sufficient clearance is provided between the piston hub 88 and the opening 162 and between the retaining ring flange 160 and the enlarged portion 164 of the opening 162 to permit axial and tilting movement of the face plate 32 in use. A suitable sealing ring 166 surrounding and snugly fitting the retaining ring flange 160 is received within an annular inwardly opening groove 168 formed in the enlarged outer portion 164 of the face plate opening 162. The purpose of the seal 166 is to prevent dirt, grit, coolant, and the like, from penetrating the body of the chuck in use but it in no way interferes with independent radial and tilting movement of the face plate in the manner hereinabove described. The outer joint between the body ring member 14 and the face plate 32 is sealed by an O-ring 170.

From the foregoing, it will be readily apparent that when the chuck is open and the jaws 36, 38 and 40 are disengaged from the work 30, the face plate 32 is free to drop for a limited distance due to the free floating universal movement of the plate permitted for compensation of eccentricity of the workpiece. However, it is desirable, and perhaps necessary in some instances particularly where workpieces are loaded and unloaded automatically, that the face plate 32 be held substantially concentrically with the rotational axis of the chuck. Otherwise, the jaws 36, 38 and 40 might and in many instances would interfere with the loading and unloading operation or with the mechanism that performs these operations. In most instances, the opening movement of the jaws 36, 38 and 40 is relatively small since it is necessary only for the work engaging surfaces 82 thereof to release the work and to move back sufficiently to accommodate the maximum variation in the size of the workpiece due to permissible manufacturing tolerances and the like and of course to provide sufficient clearance to permit insertion and removal of the work itself. Moreover, many chucks of the type involved here are used in high speed, high production operations, and it is desirable that the jaws retract the minimum permissible distance consistent with the foregoing in order to minimize the time required to operate the chuck and consequently the cycle time of the machine of which it is a part.

According to the present invention, the face plate 32 and the jaws 36, 38 and 40 carried thereby are centralized automatically when the chuck is open by an annular series (here shown as 4, FIG. 4) of balls 172 disposed in recesses or pockets 174 provided in and opening through the edge of the retainer flange 160. When the piston 84 is retracted as shown in FIG. 2 so that the chuck is closed and the jaws 36, 38 and 40 are engaged with the workpiece 30, the balls 172 rest on beveled surfaces 176 provided at the forward end of the piston hub 88 or on an annular beveled surface 178 provided at the juncture of the central face plate opening 162 and the enlarged outer portion 164 thereof. In this position of the parts referred to above, substantial clearance is provided between the balls 172 and the surrounding peripheral wall of the opening 164 to permit the full universal radial and angular adjustment required of the face plate 32. However, during initial advancement of the piston 84 in the cylinder 86 the balls 172 ride radially outwardly on the beveled surfaces 176 and engage at least lightly the surrounding surface of the opening 164. Thereafter, continued advancement of the piston 84 is permitted by movement of the balls 172 into longitudinal grooves or ways 180 formed in the periphery of the piston hub 88 in-line with the balls 172. In actual practice of course, the balls 172 are axially stationary or substantially so, and the ways 180 slide along the balls during reciprocatory travel of the piston 84. The ways 180 are sufficiently long to accommodate full forward movement of the piston 84 and, when the balls 172 are in the ways, they preferably maintain at least light engagement with the wall of the opening 164 to hold the face plate 32 centered with respect to the piston hub 88 and consequently with respect to the rotational axis of the chuck. Since forward movement of the piston 84 disengages the jaws 36, 38 and 40 from the workpiece 30, the face plate 32 is centralized on the chuck body 10 when the chuck is open and the work engaging ends 82 of the jaws are spaced essentially equidistantly radially from the center 28. Accordingly, in this position of the face plate 32 and of the jaws 36, 38 and 40, the same clearance is provided between all of the jaws and the workpiece and none of the jaws interferes with the removal of the workpiece from the chuck or the placement of a new workpiece therein. Conversely, when the piston 84 moves rearwardly in the cylinder 86, the balls 172 seat against and are held by the annular beveled surface 178 of the face plate opening 164 as the ways 180 retract along the balls. During final retractive movement of the piston 84, the balls 172 move out of the longitudinal ways 180 and release the face plate 32 so that the latter is free to adjust radially and angularly as required to equalize clamping pressures at the jaws 36, 38 and 40.

If one of the jaws 36, 38 and 40 should engage the workpiece 30 before the balls 172 are moved entirely out of the ways 180, continued retraction of the actuator plate 122 is still possible and any tendency of the actuator mechanism to bind as a result of such engagement is compensated by annular wave springs 182 mounted on the bushings 126 at the rear of actuator plate 122. Washers 184 and snap rings 186 retain the wave springs 182 on the bushings 126. The wave springs 182 normally hold the bushing flanges 142 against the front face of the actuator plate 122. However, if one of the jaws 36, 38 and 40 contracts the work 30 while the face plate 32 is still being held centralized by the balls 172, the actuator plate 122 will continue to retract for at least a limited distance under the action of the springs 144 by collapsing or flattening of the wave spring 182 associated with the jaw that has engaged the work. As the mentioned spring 182 collapses, the actuator plate 122 moves away from the radial flange 142 of the bushing 126 associated with the spring, and it will continue to do so until the balls 172 move entirely out of the ways 180. When this occurs, the collapsed spring 182 pulls the associated bushing 126 rearwardly in the actuator plate 122 until the radial flange 142 thereof again is in engagement with the actuator plate 122. Simultaneously, the face plate 32 shifts radially and angularly as required to equalize pressure at all of the jaw faces and to position the face plate so that the jaws hold the workpiece 30 securely without distorting the same from its "as is" condition.

From the foregoing, it will be readily apparent that, in the operation of the chuck, the drive from the spindle 24 is through the body 10, the driving ring 56, and the face plate 32 to the work holding jaws 36, 38 and 40. The chuck is opened and the jaws 36, 38 and 40 are disengaged from the work by air under pressure introduced into the cylinder 86 behind the piston 84. Air pressure behind the piston 84 advances the latter and, as the piston advances, it picks up the actuator plate 122 and carries it forwardly in the chuck body. Forward movement of the actuator plate 122 acts through the cross pins 128 and the helical cams 130 to turn the jaws 36, 38 and 40 clockwise as viewed in FIG. 1 to release the workpiece 30. Forward movement of the piston 84 also acts through the balls 172 and the ways 180 to centralize the face plate 32 and to hold it centralized during loading and unloading of the chuck. After the finished workpiece has been removed and a new workpiece 30 has been loaded, the chuck is closed by shutting off air pressure to the chuck body and venting the cylinder 86 behind the piston to atmosphere. This permits the compression springs 118 to retract the piston 84, and as the piston retracts it permits the springs 144 to retract the actuator plate 122 which again acts through the cross pins 128 and the helical cams 130 to turn the chuck jaws 36, 38 and 40 this time counterclockwise into clamping engagement with the workpiece 30. During its final retractive movement, the piston 84 moves rearwardly away from the actuator plate 122 so that the full force of the compression springs 144 is utilized to hold the cam jaws 36, 38 and 40 clamped solidly against the workpiece 30. Also, during final retractive movement of the piston 84, the balls 172 move out of the ways 180 and release the face plate 32 so that the latter is free to move radially and angularly as required to equalize pressure at the work engaging cam faces of the jaws and to accommodate eccentricity and other aberrations in the form of the workpiece. Any tendency of the jaw actuating mechanism to bind at this time is relieved automatically by the wave springs 182.

The chuck of this invention has essentially great holding and driving power and yet it is capable also of gripping a relatively fragile or readily distortable workpiece without bending or stressing it from its normal "as is" condition. The floating portion of the mechanism is relatively light in weight so that there is little or no tendency of the clamping pressure exerted by the jaws to diminish in use due to centrifugal action or other causes. The holding power of the chuck is substantial because of the self energizing cam type of jaw. The full force of the springs that hold the jaws engaged with the work is available at all times and this force is not significantly diminished at any time under the conditions of use.

We claim:

1. A work driver chuck comprising a rotatable body;
   a work holding assembly carried by said body including
   a face plate mounted for limited free floating universal radial and angular movement relative to said body,
   circumferentially spaced cam jaws having pivot shafts journaled in said face plate and movable about said pivot shafts into and out of clamping engagement with a workpiece in said chuck,
   a pressure plate reciprocally movable on said pivot shafts toward and from said face plate, and
   first actuator means operable in response to reciprocable movement of said pressure plate in one direction to turn said pivot shafts in a direction to engage said cam jaws with said workpiece and in response to movement thereof in the other direction to turn said pivot shafts in a direction to disengage said cam jaws from said workpiece;
   second actuator means for reciprocally driving said pressure plate; and
   means rotatably drivingly connecting said body and said work holding assembly.

2. The work driver chuck defined by claim 1 including
   centralizing means normally positioning said work holding assembly with said cam jaws disposed substantially concentrically to the rotational axis of the chuck during movement thereof toward and from said workpiece but adapted to release said assembly for free floating movement during clamping engagement of said jaws with said workpiece.

3. The work driver chuck as defined in claim 2 wherein
   said second actuator means includes a piston having a portion thereof disposed concentrically to the rotational axis of said chuck and provided with a plurality of circumferentially spaced, longitudinal ways; and
   wherein said centralizing means comprises a plurality of centralizing elements movable in said ways during reciprocatory travel of said piston to move said jaws to and from said workpiece and engageable with said face plate during said travel to position said work holding assembly substantially concentrically to said rotational axis;
   said centralizing elements being movable out of said ways to disengage said face plate during clamping engagement of said cam jaws with said workpiece to release said work holding assembly for universal movement relative to said body.

4. The work driver chuck as defined in claim 1 wherein
said first actuator means comprises coactive cam and cam follower means associated with said pivot shafts and said pressure plate, respectively, operable by reciprocable movement of said pressure plate relative to said pivot shafts to turn said shafts and said cam jaws selectively to clamp or release said workpiece.

5. A work driver chuck as defined in claim 1 including
bushings carried by and rotatably fixed to said pressure plate and slidable on said pivot shafts; and wherein
said first actuator means comprises helical cam surfaces on said pivot shafts, and cross pins carried by said bushings and operatively engaging said helical cam surfaces, whereby sliding engagement of said cross pins on said helical cam surfaces turns said pivot shafts to engage or disengage said cam jaws depending on the direction of travel of said pressure plate.

6. The work driver chuck as defined in claim 1 wherein said second actuator means comprises spring driver means at one side of said pressure plate for driving the latter in said one direction, and a power piston at the other side of said pressure plate engageable therewith and operative to move the same in said other direction.

7. The work driver chuck as defined in claim 1 including
bushings carried by said pressure plate, said bushings being slidable on said pivot shafts and adapted for limited sliding movement relative to said pressure plate; and wherein
said first actuator means comprises cam and cam follower means on said pivot shafts and said bushings, respectively, operable by sliding movement of said bushings on said pivot shafts to swing said cam jaws to and from said workpiece; and wherein
said second actuator means comprises spring driver means at one side of and engageable with said pressure plate operative to move the latter in said one direction, and a power piston at the other side of and engageable with said pressure plate operative to move the latter in said other direction;
said chuck further including spring means at said other side of said pressure plate coacting with said pressure plate and said bushings and acting in opposition to said spring driver means, said spring means normally holding said bushings at one limit of their sliding movement relative to said pressure plate but adapted to yield under certain operating conditions to permit said pressure plate to move on said bushings in said one direction without corresponding movement of said pivot shafts and said cam jaws.

8. The work driver chuck defined by claim 1 including
centralizing means normally positioning said work holding assembly with said cam jaws disposed concentrically to the rotational axis of the chuck during movement thereof toward and from said workpiece but adapted to release said assembly for free floating universal movement during clamping engagement of said jaws with said workpiece; and
wherein said first actuator means comprises coactive cam and cam follower means associated with said pivot shafts and said pressure plate, respectively, operable by reciprocable movement of said pressure plate relative to said pivot shafts to turn said shafts and said cam jaws selectively to clamp or release said workpiece.

9. The work driver chuck as defined as claim 2 wherein
said second actuator means includes a piston having a portion thereof disposed concentrically to the rotational axis of said chuck and provided with a plurality of circumferentially spaced, longitudinal ways; wherein
said first actuator means comprises coactive cam and cam follower means associated with said pivot shafts and said pressure plate, respectively, operable by reciprocable movement of said pressure plate relative to said pivot shafts to turn said shafts and said cam jaws selectively to clamp or release said workpiece; and wherein
said centralizing means comprises a plurality of centralizing elements movable in said ways during reciprocatory travel of said piston to move said jaws to and from said workpiece and engageable with said face plate during said travel to position said work holding assembly substantially concentrically to said rotational axis, said centralizing elements being movable out of said ways to disengage said face plate during clamping engagement of said cam jaws with said workpiece to release said work holding assembly for free floating movement relative to said body.

10. The work driver chuck defined by claim 1 including
centralizing means normally positioning said work holding assembly with said cam jaws disposed substantially concentrically to the rotational axis of the chuck during movement thereof toward and from said workpiece but adapted to release said assembly for free floating universal radial and angular movement during clamping engagement of said jaws with said workpiece; and
bushings carried by and rotatably fixed to said pressure plate and slidable on said pivot shafts; and wherein
said first actuator means comprises helical cam surfaces on said pivot shafts, and cross pins carried by said bushings and operatively engaging said helical cam surfaces, whereby sliding engagement of said cross pins on said helical cam surfaces turns said pivot shafts to engage or disengage said cam jaws depending on the direction of travel of said pressure plate.

11. The work driver chuck defined by claim 1 including
centralizing means normally positioning said work holding assembly with said cam jaws disposed substantially concentrically to the rotational axis of the chuck during movement thereof toward and from said workpiece but adapted to release said assembly for free floating universal movement during clamping engagement of said jaws with said workpiece; and wherein
said second actuator means comprises spring driver means at one side of said pressure plate for driving the latter in said one direction, and a power piston at the other side of said pressure plate engageable therewith and operative to move the same in said other direction.

12. The work driver chuck defined by claim 1 including centralizing means normally positioning said work holding assembly with said cam jaws disposed substantially concentrically to the rotational axis of the chuck during movement thereof toward and from said workpiece but adapted to release said assembly for free floating universal movement during clamping engagement of said jaws with said workpiece; wherein said first actuator means comprises bushings carried by said pressure plate, said bushings being slidable on said pivot shafts and adapted for limited sliding movement relative to said pressure plate, and cam and cam follower means on said pivot shafts and said bushings, respectively, operative by sliding movement of said bushings on said pivot shafts to swing said cam jaws to and from said workpiece; and wherein said second actuator means comprises spring driver means at one side of and engageable with said pressure plate operative to move the latter in said one direction, and a power piston at the other side of and engageable with said pressure plate operative to move the latter in said other direction; said chuck further including spring means at said other side of said pressure plate coacting with said pressure plate and said bushings and acting in opposition to said spring driver means, said spring means normally holding said bushings at one limit of their sliding movement relative to said pressure plate but adapted to yield under certain operating conditions to permit said pressure plate to move on said bushings in said one direction without corresponding movement of said pivot shafts and said cam jaws.

13. The work driver chuck as defined in claim 1 wherein said second actuator means includes a piston having a portion thereof disposed concentrically to the rotational axis of said chuck and provided with a plurality of circumferentially spaced, longitudinal ways; said chuck including centralizing means normally positioning said work holding assembly with said cam jaws disposed substantially concentrically to the rotational axis of the chuck during movement thereof toward and from said workpiece but adapted to release said assembly for free floating universal movement during clamping engagement of said jaws with said workpiece, said centralizing means having a plurality of centralizing elements movable in said ways during reciprocable travel of said piston to move said jaws to and from said workpiece and engageable with said face plate during said travel to position said work holding assembly substantially concentrically to said rotational axis, said centralizing elements being movable out of said ways to disengage said face plate during clamping engagement of said cam jaws with said workpiece whereby to release said work holding assembly for universal radial movement relative to said body; said first actuator means including bushings carried by and movable with said pressure plate, said bushings being slidable on said pivot shafts and having limited sliding movement relative to said pressure plate, and cam and cam follower means on said pivot shafts and said bushings, respectively, operative by sliding movement of said bushings on said pivot shafts to swing said cam jaws to and from said workpiece;

said second actuator means also comprising spring driver means at one side of and engageable with said pressure plate operative to move the latter in said one direction, said piston being disposed at the other side of and engageable with said pressure plate and being operative to move the latter in said other direction; said chuck further including spring means at said other side of said pressure plate coacting with said pressure plate and said bushings and acting in opposition to said spring driver means, said spring means normally holding said bushings at one limit of their sliding movement relative to said pressure plate but adapted to yield in the event one of said cam jaws engages said workpiece before said centralizing elements move out of said ways whereby to permit said pressure plate to move on said bushings in said one direction without corresponding movement of said pivot shafts and said cam jaws.

14. A work driver chuck comprising a rotatable body;

face and pressure plates carried by and rotatable with said body; means interconnecting said face and pressure plates for limited mutual universal radial and angular movement relative to the chuck axis and for movement axially relative to each other;

jaw assemblies carried by and movable universally with said face and pressure plates and having pivoted cam jaws;

actuator means for moving said pressure plate axially relative to said face plate; and means actuated by movement of said pressure plate axially relative to said face plate for pivoting said cam jaws into and out of engagement with a workpiece in said chuck.

15. A work driver chuck as defined by claim 14 including means for holding said jaw assemblies essentially concentric to the chuck axis during movement of said cam jaws relative to the workpiece.

16. The work driver chuck as defined by claim 14 including means coactive with said face plate to hold the latter and said jaw assemblies concentric to said chuck axis during movement of said jaws relative to said workpiece, said means being operative substantially upon engagement of the workpiece by said jaws to release said face plate for free radial and angular movement to equalize clamping pressure at said jaws.

17. The work driver chuck defined by claim 14 further provided with means including said face plate for holding said jaw assemblies concentric to said chuck axis during movement of said cam jaws relative to said workpiece operative in response to clamping pressure to shift said cam plate and said jaw assemblies radially and angularly as required to equalize pressure of said cam jaws against the workpiece.

* * * * *